(12) United States Patent
Ma et al.

(10) Patent No.: US 8,916,185 B2
(45) Date of Patent: *Dec. 23, 2014

(54) IMMOBILIZING PARTICLES ONTO SURFACES

(75) Inventors: Peter X. Ma, Ann Arbor, MI (US); Guobao Wei, Eatontown, NJ (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1539 days.

This patent is subject to a terminal disclaimer.

(21) Appl. No.: 12/038,783

(22) Filed: Feb. 27, 2008

(65) Prior Publication Data

US 2008/0268059 A1 Oct. 30, 2008

Related U.S. Application Data

(60) Provisional application No. 60/891,985, filed on Feb. 28, 2007.

(51) Int. Cl.
| | |
|---|---|
| *A61F 2/00* | (2006.01) |
| *A61F 13/00* | (2006.01) |
| *A61K 9/70* | (2006.01) |
| *A61K 9/14* | (2006.01) |
| *B01D 67/00* | (2006.01) |

(52) U.S. Cl.
CPC ........ *B01D 67/0004* (2013.01); *B01D 2323/22* (2013.01); *B01D 67/0083* (2013.01)
USPC ............................ 424/423; 424/443; 424/489

(58) Field of Classification Search
None
See application file for complete search history.

(56) References Cited

U.S. PATENT DOCUMENTS

| | | | | |
|---|---|---|---|---|
| 4,083,741 | A * | 4/1978 | Goldberg ...................... | 156/184 |
| 5,229,233 | A * | 7/1993 | Riddle et al. .................. | 430/23 |
| 5,456,917 | A * | 10/1995 | Wise et al. .................... | 424/426 |
| 5,460,701 | A | 10/1995 | Parker et al. | |
| 6,656,506 | B1 * | 12/2003 | Wu et al. ....................... | 424/489 |
| 2003/0069631 | A1 * | 4/2003 | Stoll ............................. | 623/1.15 |
| 2004/0220660 | A1 * | 11/2004 | Shanley et al. ............... | 623/1.16 |
| 2005/0208271 | A1 * | 9/2005 | Fasching et al. .............. | 428/156 |
| 2006/0246121 | A1 | 11/2006 | Ma et al. | |
| 2008/0281409 | A1 * | 11/2008 | Malone et al. ................ | 623/1.46 |

FOREIGN PATENT DOCUMENTS

| | | | |
|---|---|---|---|
| GB | 2360789 A | * | 10/2001 |
| KR | 2006/60144 | | 6/2006 |

OTHER PUBLICATIONS

Chandaroy et al. Journal of Controlled Release 2001 76:27-37.*
Zhang et al. Chemistry of Materials 2005 17:696-700.*
Lee et al. Biomaterials 2004 25:4163-4173.*
Pieper et al. Biomaterials 1999 20:847-858.*
Li et al. Macromolecular Symposia 2005 227:65-75.*
Tu et al. Polymers for Advanced Technologies 2003 14:565-573.*
Moioli et al. Tissue Engineering 2006 12:537-546.*
Ma et al. Journal of Biomedical Materials Research 1999 46:60-72.*
Pak Biomatirials 1995 16:1123-1130.*
Shah et al. Analytical Chemistry 2006 78:3348-3353.*
International Search Report for PCT/US2008/055200 dated Aug. 14, 2008 (11 pages).
Wei, G., Q. Jin, W.V. Giannobile, and P.X. Ma, "Nano-fibrous scaffold for controlled delivery of recombinant human PDGF-BB," J Control Release, 2006, 112(1): pp. 103-110.
International Preliminary Report on Patentabity for International Appln. No. PCT/US2008/055200 dated Sep. 11, 2009 (7 pages).

* cited by examiner

*Primary Examiner* — Robert A Wax
*Assistant Examiner* — Caralynne Helm
(74) *Attorney, Agent, or Firm* — Dierker & Associates, P.C.

(57) ABSTRACT

A method for immobilizing micro-particles, nano-particles or combinations thereof onto a surface is disclosed. The method includes distributing the micro-particles, nano-particles or combinations thereof onto the surface. The surface and the particles are exposed to thermal treatment, vapor treatment or combinations thereof, thereby adhering at least some of the micro-particles, nano-particles or combinations thereof to the surface. Materials including such immobilized micro-particles, nano-particles or combinations thereof are also disclosed herein.

15 Claims, 6 Drawing Sheets

IMMOBILIZING PARTICLES ONTO SURFACES

CROSS-REFERENCE TO RELATED APPLICATIONS

This application claims the benefit of U.S. Provisional Application Ser. No. 60/891,985, filed Feb. 28, 2007.

BACKGROUND

The present disclosure relates generally to immobilizing particles onto various surfaces, including relatively simple surfaces and complex porous surfaces.

Particle immobilization techniques often include treating particle containing porous materials with a solvent or a solvent mixture. Such methods are capable of achieving relatively strong adhesion between the porous materials and the particles. In some instances, however, a liquid immobilization procedure may be undesirable. As such, it would be desirable to provide other methods for immobilizing particles onto a variety of different surfaces.

SUMMARY

A method for immobilizing micro-particles, nano-particles or combinations thereof onto a surface is disclosed herein. The method includes distributing the micro-particles, nano-particles or combinations thereof onto the surface. The surface and the particles are exposed to thermal treatment, vapor treatment or combinations thereof, thereby adhering at least some of the micro-particles, nano-particles or combinations thereof to the surface.

BRIEF DESCRIPTION OF THE DRAWINGS

Features and advantages of embodiments of the present disclosure will become apparent by reference to the following detailed description and drawings, in which.

DETAILED DESCRIPTION

The present inventors have unexpectedly and fortuitously discovered a series of methods to immobilize particles on surfaces having relatively simple geometries or relatively complex geometries. The methods include thermal and/or vapor technologies for the immobilization of such particles.

As used herein, the term "micro-particles" includes particles having a size ranging from about $10^{-6}$ m and about $10^{-3}$ m, and the term "nano-particles" includes particles having a size ranging from about $10^{-9}$ m and about $10^{-6}$ m. The term "particles" as used herein, refers to micro-particles, nano-particles or combinations thereof. The particles may have any regular or irregular shape, and may be formed of one or more of materials listed hereinbelow.

It is to be understood that the materials forming the particles and/or the surface are selected because they are capable of exhibiting a predetermined adhesive property when exposed to thermal and/or vapor treatments.

In the embodiments disclosed herein, the materials of the particles and/or the surface may be any natural or synthetic materials; organic materials, inorganic materials, metallic materials, tissue derived materials, low molecular mass molecules, composites thereof, and/or combinations thereof. In an embodiment, the materials are organic materials. They may be natural or synthetic macromolecules. In one embodiment, the materials are at least one of polymers, proteins, carbohydrates, lipids, sugars, waxes, glass, ceramics, and combinations thereof.

Some suitable non-degradable polymers include, but are not limited to water insoluble (hydrophobic) polymers/macromolecules that include polytetrafluoroethylene (PTFE), polyvinylchloride (PVC), polyethylenes (PE), polypropylenes (PP), polystyrenes, polyacrylonitrile (PAN), polymethylmethacrylate (PMMA), polyvinylacetate (PVAc), polyphenylene oxide, polypropylene oxide (PPO), polyvinylidene fluoride (PVDF), polybutylene, polyamides (PA, Nylons), polyesters, polycarbonates, polyurethanes, polysiloxanes, polyimides, polyetheretherketone (PEEK), polysulfones, polyethersulphone, cellulose, polysaccharides and their derivatives, or mixtures thereof.

When polymerization of monomers is used to obtain the polymers/macromolecules, some exemplary suitable hydrophobic unsaturated monomers include the following: acrylates, methacrylates (eg. methyl methacrylate), ethylene, propylene, tetra-fluoroethylene, styrene, vinyl chloride, vinylidene chloride, vinyl acetate, acrylonitrile, 2,2-bis[4-(2-hydroxy-3-methacryloyloxy-propyloxy)-phenyl] propane (Bis-GMA), ethyleneglycol dimethacrylate (EGDMA), triethyleneglycol dimethacrylate (TEGDMA), bis(2-methacryly-oxyethyl) ester of isophthalic acid (MEI), bis(2-methacrylyoxyethyl) ester of terephthalic acid (MET), bis(2-methacrylyoxyethyl) ester of phthalic acid (MEP), 2,2-bis(4-methacrylyoxy phenyl) propane (BisMA), 2,2-bis[4-(2-methacrylyloxyethoxy) phenyl] propane (BisEMA), 2,2-bis[4-(3-methacrylyloxy-propoxy) phenyl] propane (BisPMA), hexafluoro-1,5-pentanediol dimethacrylate (HFPDMA), bis-(2-methacrylyloxyethoxy-hexafluoro-2-propyl) benzene [Bis(MEHFP)φ], 1,6-bis(methacrylyloxy-2-ethoxycarbonylamino)-2,4,4-tri-methylhexan (UEDMA), spiro orthocarbonates, other vinyl monomers, the derivatives of these monomers, and mixtures thereof. Monomers of condensation polymers may also be used to form the surfaces. Some non-limiting examples of monomer types in this category are diacids and diols (pairs), ω-hydroxy carboxylic acids, lactones, diacids and diamines (pairs), amino acids, lactams, diisocyanates, diols (pairs), and/or combinations thereof.

Biodegradable polymers and macromolecules may also be used, especially when controlled release properties (e.g., of the particles) are desired. Some exemplary, non-limitative biodegradable polymers include: poly(lactide-co-glycolide) (PLGA), poly(L-lactic acid) (PLLA), poly(D,L-lactic acid) (PDLLA), polyglycolic acid (PGA), polyanhydrides, poly(ortho ethers), poly(ε-caprolactone) (PCL), poly(hydroxy butyrate) (PHB), poly(propylene fumarate) (PPF), polyphosphoesters (PPE), polyphosphazenes, and/or mixtures thereof. It is to be understood that degradable natural macromolecules (typically enzymatically degradable) such as collagen, gelatin and many other proteins, carbohydrates, and/or their derivatives may also be used.

Some exemplary, non-limitative water-soluble (hydrophilic) polymers/macromolecules that are suitable materials for the surface and/or particles include polyvinyl alcohol, polyethylene oxide (polyethylene glycol), polymethacrylic acid (PMAA), polyvinyl pyrolidone, polyacrylic acid, poly(lysine), poly(allylamine), poly(ethylenimine), poly(acrylamide), poly(acrylamide-co-arylic acid), poly(acrylamide-co-diallyldimethylammonium chloride), poly(vinyl alcohol), poly(ethylene glycol), polyethylene-block-poly(ethylene glycol), poly(propylene glycol), poly(2-hydroxypropyl methacrylate), poly(2-hydroxyethyl methyacrylate), poly(4-hydroxystrene), polyethylene monoalcohol, poly(vinyl alcohol-co-ethylene), poly(styrene-co-allyl alcohol), hydroxyethylcellulose, alginate, pectin, chitin, chitosan, dextran, hyaluronic acid, collagen, gelatin, and/or mixtures thereof.

Some exemplary suitable acid-containing hydrophilic monomers include the following: monomers containing carboxylic acid: acrylic acid, methacrylic acid, 4-vinylbenzoic acid, crotonic acid, oleic acid, elaidic acid, itaconic acid, maleic acid, fumaric acid, acetylenedicarboxylic acid, tricarbollylic acid, sorbic acid, linoleic acid, linolenic acid, eicosapentenoic acid, other unsaturated carboxylic acids, anhydrides, their derivatives, and mixtures thereof, other organic acids such as sulfonic acid, and/or phosphonic acid replacement of the carboxyl group of the above listed unsaturated carboxylic acids, their derivatives, and mixtures thereof. Some exemplary suitable amine-containing hydrophilic monomers include allylmine, 4-vinylaniline, L-lysine, D-lysine, DL-lysine, acrylamide, their derivatives, and mixtures thereof. Some exemplary suitable hydroxyl-containing hydrophilic monomers include 2-hydroxypropyl methacrylate, 2-hydroxyethyl methyacrylate, 4-hydroxystrene, ethylene glycol, propylene glycol, poly(ethylene glycol) acrylate, poly(ethylene glycol) methacrylate, their derivatives, and/or mixtures thereof.

Many natural macromolecules and synthetic polymers may be both hydrophilic and hydrophobic (amphiphilic). Such polymers could also be used for certain surface or particle preparations, such as those containing acid, amine, hydroxyl, and/or other hydrophilic groups in some or all of their structural units. Many of these polymers are copolymers containing both hydrophilic and hydrophobic moieties.

Agents may be incorporated in the particles to form controlled release particles. As a non-limiting example, the desirable agent is encapsulated in the materials forming the particle. Non-limiting examples of such agents include proteins, hormones, DNA, RNA, nutrients, drugs, other biologically regulating agents, and/or the like. It is to be understood that the agents (molecules, ions, or mixtures thereof) are not limited to applications to stimulate cell adhesion, growth, and tissue regeneration. They may be any drugs, pain suppressors, anti-inflammatory agents, sterilizing agents, contraceptives, pesticides, fertilizers, fragrances, spices, and so forth. Furthermore, the agents do not have to be biologically active. The agents could be functional in other ways, such as, for example, controlling pH, varying colors, imparting fluorescence, maintaining humidity, adjusting conductivities, enhancing mechanical properties, mediating surface properties, modifying topography, or as morphological modifications.

Some exemplary, non-limitative biologically active agents include bone morphogenetic proteins (such as BMP-2, BMP-3, BMP-4, BMP-6, BMP-7 and so forth), transforming growth factors (TGFs, such as TGF-α and TGF-β), acidic fibroblast growth factor (aFGF) and basic fibroblast growth factor (bFGF), platelet-derived growth factor (PDGF, PDGF-BB and so forth), epidermal growth factor (EGF), vascular endothelial growth factor (VEGF), hepatocyte growth factor (HGF), nerve growth factor (NGF), insulin, insulin-like growth factors (IGFs), parathyroid hormone (PTH), parathyroid hormone related protein (PTHrP), DNAs that encode various factors including the above listed, double-stranded RNAs (dsRNAs) that interfere (silence) the genes of various factors including the above listed, various biologically functional peptides (RGD and so forth), vitamins, ascorbate-2-phosphate, dexamethasone, 1-glutamine, and so forth. These agents may be delivered alone or in combination to achieve individualized or synchronized delivery to achieve synergistic or additive effects.

One embodiment of the method includes distributing the micro-particles, nano-particles or combinations thereof on the surface. In an embodiment, distributing includes suspending the particles in a non-solvent of at least one of: i) the surface, ii) the particles or iii) both the surface and the particles, to form a non-solvent-particle suspension. This suspension is added to the surface. In other embodiments, the particles are distributed on the surface by pouring the particles directly on the surface, or by exposing the surface to a gas stream including the particles. The particles may loosely attach to the surface via physical processes (e.g., adsorption or weak mechanical entrapment). It is to be understood that, at this point in the process, the loosely attached (or distributed) particle may be washed off with a non-solvent.

The distributed particles and the surface are then exposed to thermal treatment, vapor treatment, and/or combinations thereof The treatments (alone or in combination) result in the strong adhesion of at least some of the loosely attached particles to the surface. Without being bound to any theory, it is believed that after heat and/or thermal treatment, the adhered particles may not be removed using a non-solvent.

The conditions of the heat and/or vapor treatment depend, at least in part, on the materials selected for the particles and/or surfaces. In an embodiment, the heat and/or vapor is sufficient to manifest the adhesive property of the surface and/or particles. In a further embodiment, a suitable temperature is often the temperature at which the material starts to soften or deform. This temperature may often be related to the softening temperature, and thermal transition temperatures (such as, for example, the glass transition temperature, melting temperature, etc.) of the material. Once a material is selected, this temperature(s) may be determined via available literature or simple experimentation. For the vapor treatment technique, once the materials are selected, the suitable solvents may be determined via available literature, or via a simple dissolution experiment. Generally, the treating gas contains at least one solvent vapor for one of the materials (either the particles or the surfaces).

The treatment time may range from a second to multiple hours. In a non-limiting example, the treatment time ranges from about 10 minutes to about 12 hours. In another non-limiting example, the treatment time ranges from about 10 minutes to about 6 hours. In still another non-limiting example, the treatment time is about 30 minutes.

In an embodiment, the surface is a relatively simple object or is a complex porous material (a non-limitative example of which is described in U.S. Provisional Patent Application No. 60/773,882, filed Feb. 16, 2006, which is incorporated herein by reference in its entirety). It is to be understood that the surfaces may have any suitable geometry, morphology, and/or thickness. For example, the surfaces may be three-dimensional (3D) objects, or substantially flat surfaces. In another example, the surfaces are interior and/or exterior surfaces of the pores formed in the porous materials. More specific examples of the surfaces include, but are not limited to tissue engineering scaffolds, wound-healing dressings, filtration membranes, dialysis devices, chromatographic fillers, and/or the like, and/or combinations thereof.

To further illustrate embodiment(s) of the present disclosure, various examples are given herein. It is to be understood that these examples are provided for illustrative purposes and are not to be construed as limiting the scope of the disclosed embodiment(s).

EXAMPLES

It is to be understood that the particle immobilizing techniques disclosed herein are not limited to a specific material or solvent system. In the present non-limitative examples, however, porous nanofibrous poly(L-lactic acid) (PLLA) scaffolds and nano- and micro-spheres made of poly(lactide-co-glycolide) (PLGA) were used. The spheres included PLGA50-14K with an LA/GA ratio of 50:50 and a molecular weight of 14 kDa, and PLGA75-113K with an LA/GA ratio of 75:25 and a molecular weight of 113 kDa.

The various immobilization processes included solvent treatment (comparative example), heat treatment and vapor treatment. In all of the examples discussed below, a washing test was performed after the respective immobilization procedure was complete. The washing test was performed to qualitatively and quantitatively examine the efficacy of each immobilization technique. The washing test generally included placing the respective NS-scaffold in a 5-ml glass vial containing 1 ml PBS buffer solution (with 0.1 wt % sodium dodecyl sulfate), and washing the NS-scaffold at room temperature under orbital shaking at 75 rpm for 2 hours. The detachment of nanospheres from the scaffold was recorded on photographs (turbidity) and quantified by measuring weight loss. The morphologies of the scaffolds (before and after treatment and after washing) were examined using scanning electron microscopy (SEM).

Comparative Example

Previously disclosed methods for immobilizing particles on surfaces include using a mixture of solvents or non-solvents, or an intermediate solvent that can partially dissolve the particles, scaffolds, or both to achieve immobilization. The distinct requirement of this technique is the usage of a liquid in direct contact with the particles and surfaces of the porous materials (e.g., scaffolds). Generally, the solvent used dissolves the nanospheres and/or the scaffolds, while the non-solvent dissolves neither the nanospheres nor the scaffolds.

About 80 µl solvent/non-solvent mixture (Tetrahydrofuran (THF)/hexane=10/90) was added onto the PLGA nanospheres (NS)-containing PLLA scaffold (dimension: 7.2 mm in diameter and 2 mm in thickness). The resulting NS-scaffold was left in a fume hood for two hours to evaporate most of the solvents. This was followed by a vacuum dry for 2 days to remove the remaining solvents. Scaffolds without nanospheres were used for comparison to examine the effect of solvent mixture treatment on the structure of nano-fibrous scaffolds.

While THF and hexane were used in this example, many solvents and non-solvents may be used, as long as they are mixable. For example, the solvent may be selected from THF, acetone, benzene, dioxane, etc.; and the non-solvent may be selected from hexane, cyclohexane, ethanol, etc. The ratio of solvent and non-solvent is selected to achieve the desired immobilization with minimal side effects. In an embodiment of the comparative example, the treatment maintains the morphologies of both the nanospheres and the structures of the scaffold, while immobilizing the nanospheres onto the scaffolds.

Figure 1:
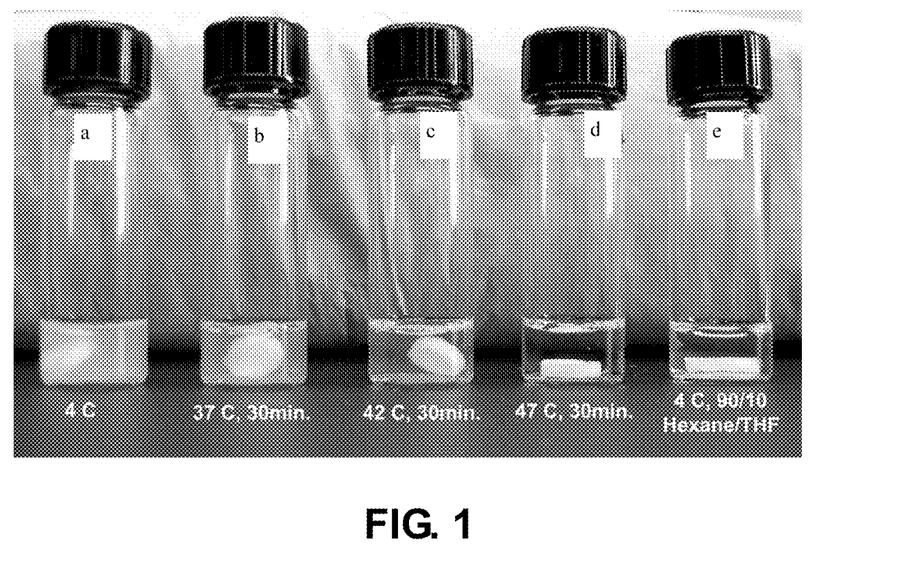
FIG. 1 is a photograph of PLGA50-14K NS (nanosphere)-scaffold in a washing test experiment after: a) no immobilization treatment; b) the scaffold was treated at 37° C. for 30 minutes; c) the scaffold was treated at 42° C. for 30 minutes; d) the scaffold was treated at 47° C. for 30 minutes; and e) the scaffold was treated with 90/10 hexane/tetrahydrofuran (THF) mixture solvent.
Figure 2A:
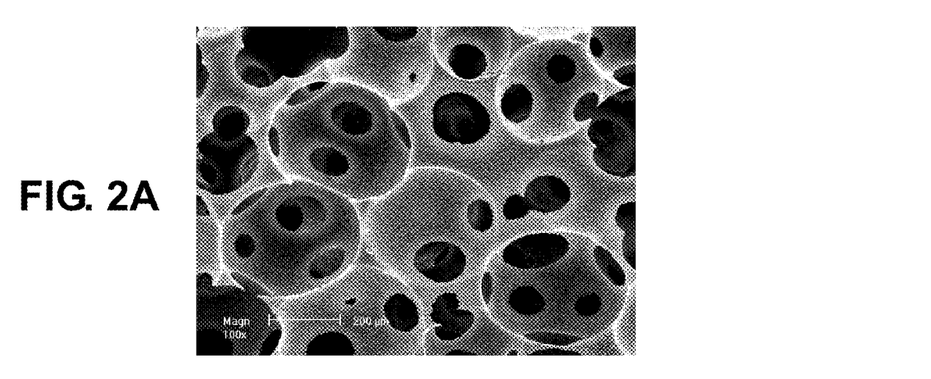
FIGS. 2A through 2D depict scanning electron microscopy (SEM) micrographs of a PLGA50-14K NS-scaffold after treatment with: a) a 10/90 mixture of THF/hexane, at 100× magnification, b) the 10/90 mixture of THF/hexane, at 10,000× magnification, c) a 20/80 mixture of THF/hexane, at 100× magnification, and d) the 10/90 mixture of THF/hexane, at 10,000× magnification.
Figure 2B:
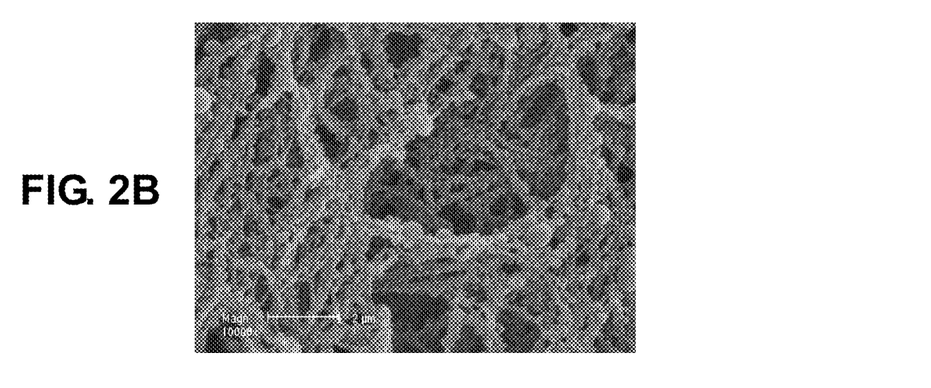
Figure 2C:
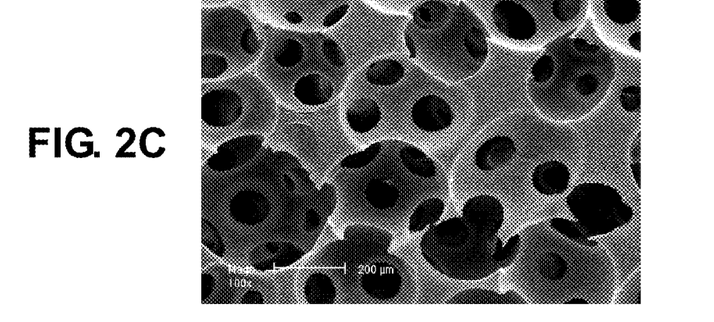
Figure 2D:
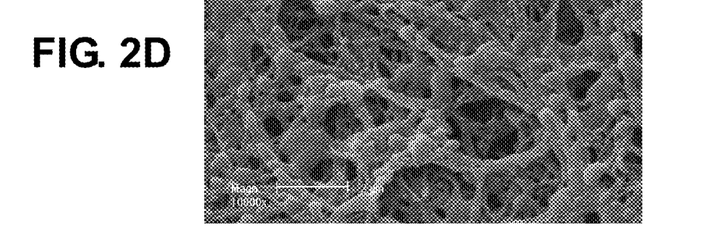

The THF/hexane mixture treatment of NS-scaffold successfully immobilized the nanospheres on the nano-fibrous scaffold. Without treatment by the solvent mixture, large amounts of nanospheres detached from the scaffold during the washing test, and the PBS solution became turbid, in part, because of the suspended nanospheres (see FIG. 1, vial a). In contrast, the nanosphere detachment was negligible in scaffolds treated with THF/hexane (v/v ratio of 10/90); the washing solution remained clear during the washing test (see FIG. 1, vial e). From SEM observation, the 10/90 THF/hexane solvent mixture treatment did not interfere with the macro, micro, and nano-fibrous structures of the scaffold, nor with the morphology of the nanospheres (see FIGS. 2A and 2B). FIGS. 2C and 2D depict that, with an increase in solvent (THF) percentage to 20 vol. % in the mixture, the nanospheres deformed, but the structures of the 3D scaffold remained substantially intact.

Heat Treatment Example

Without being bound to any theory, it is believed that heat treatment as disclosed herein results in efficient immobilization of particles onto a variety of surfaces, including complex surfaces (e.g., nanospheres or microspheres (i.e., "particles") onto scaffolds). It is further believed that the polymer chains of the particles and surfaces entangle with each other under high temperatures. In this example, the particles in a porous material (e.g., NS-scaffold) are heat treated at a certain temperature for a certain period of time. It is to be understood that more complicated temperature treatment patterns may also result in immobilization. Scaffolds without nanospheres were used for comparison to examine the effect of heat treatment on the structure of the scaffolds (e.g., the nano-fibrous structure of a PLLA scaffold).

Figure 3:
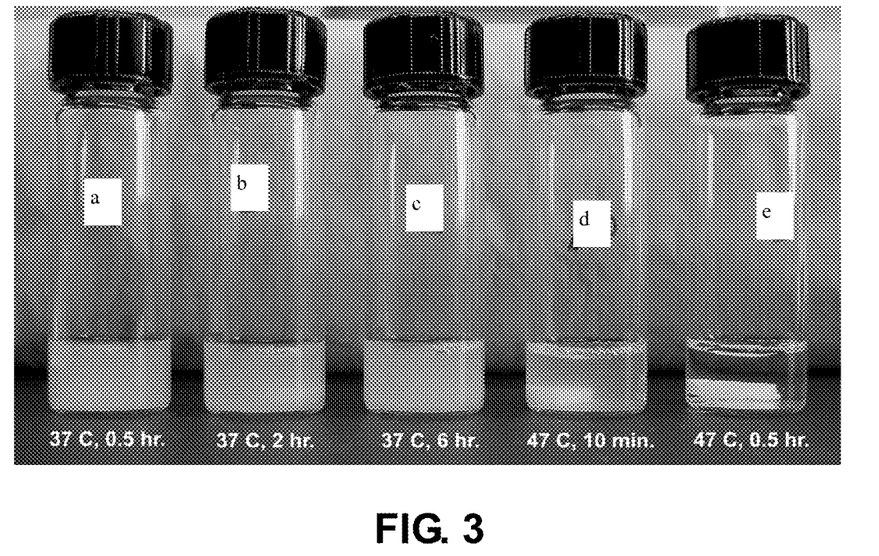
FIG. 3 is a photograph of PLGA50-14K NS-scaffold in a washing test experiment after: a) the scaffold was treated at 37° C. for 30 minutes; b) the scaffold was treated at 37° C. for 2 hours; c) the scaffold was treated at 37° C. for 6 hours; d) the scaffold was treated at 47° C. for 10 minutes; and e) the scaffold was treated at 47° C. for 30 minutes.
Figure 4:
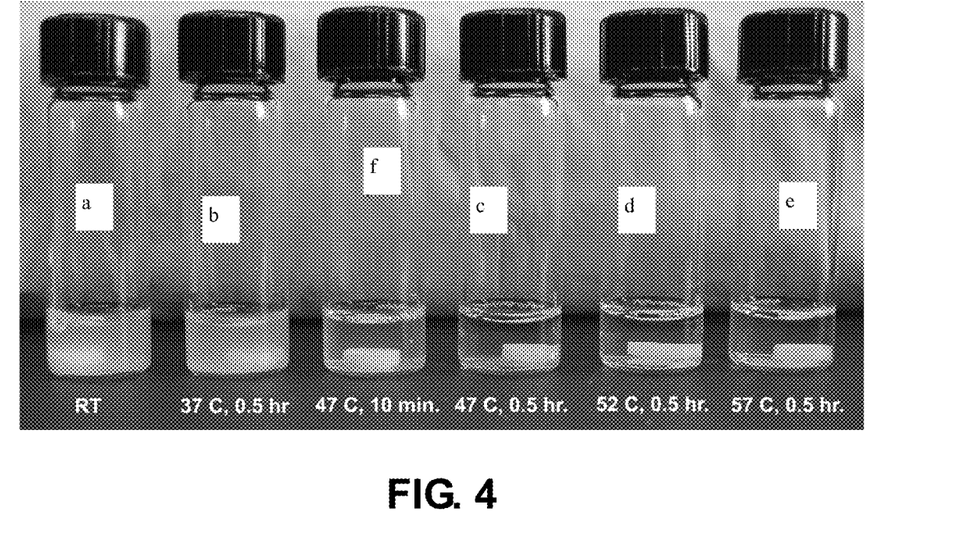
FIG. 4 is a photograph of PLGA75-113K NS-scaffold in a washing test experiment after: a) no heat treatment; b) the scaffold was treated at 37° C. for 30 minutes; c) the scaffold was treated at 47° C. for 10 minutes; d) the scaffold was treated at 47° C. for 30 minutes; e) the scaffold was treated at 52° C. for 30 minutes; and f) the scaffold was treated at 57° C. for 30 minutes.
Figure 5A:
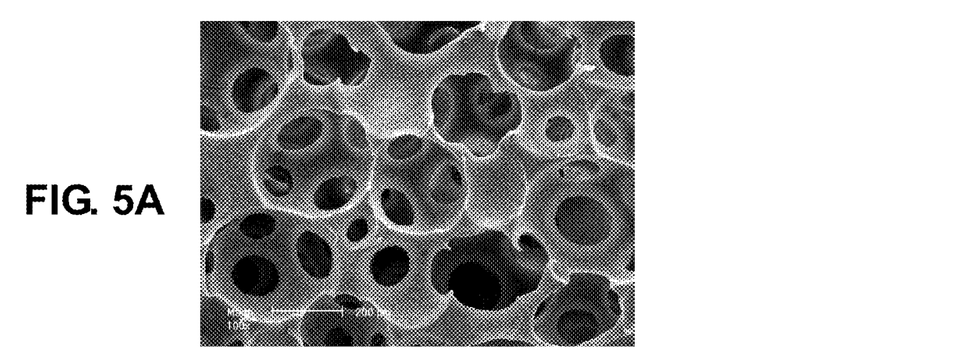
FIGS. 5A through 5F are SEM micrographs a PLGA50-14K NS-scaffold after: a) no heat treatment, at 100× magnification, b) no heat treatment, at 10000× magnification, c) no heat treatment and washing, at 100× magnification, d) no heat treatment and washing, at 10000× magnification, e) heat treatment at 47° C. for 30 minutes and washing, at 100× magnification, and f) heat treatment at 47° C. for 30 minutes and washing, at 10000× magnification.
Figure 5B:
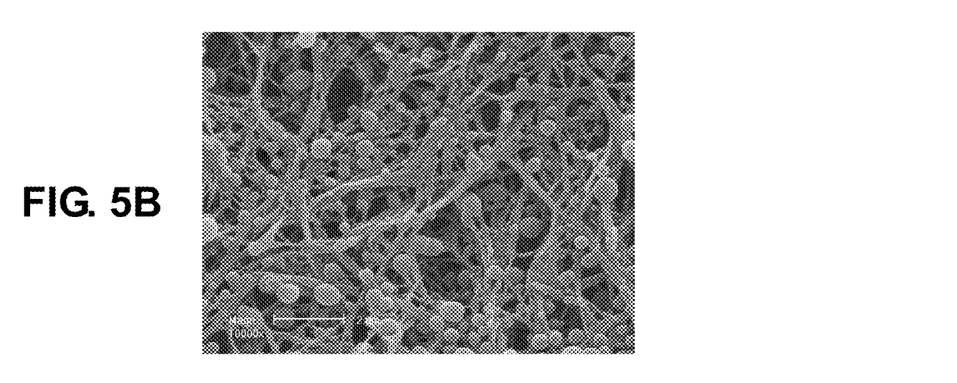
Figure 5C:
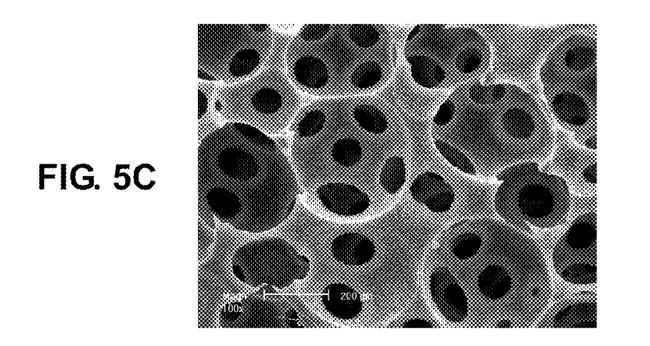
Figure 5D:
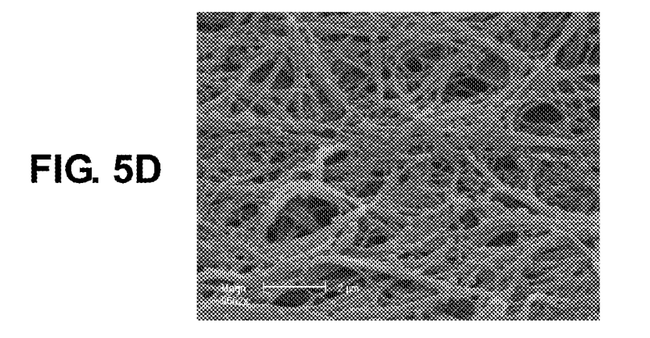
Figure 5E:
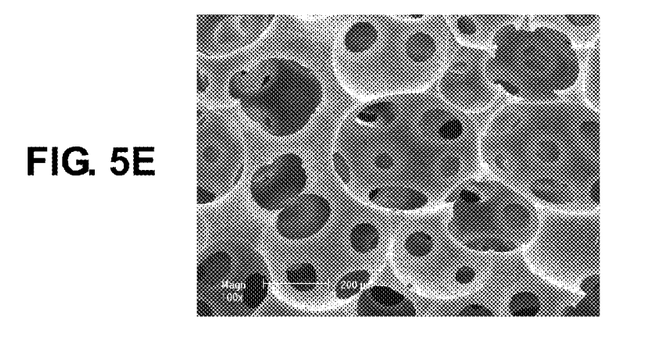
Figure 5F:
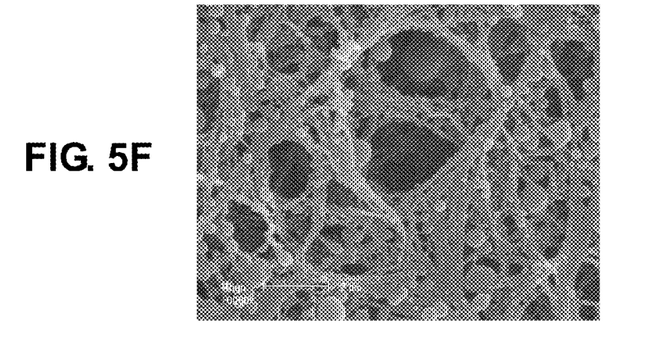
Figure 6:
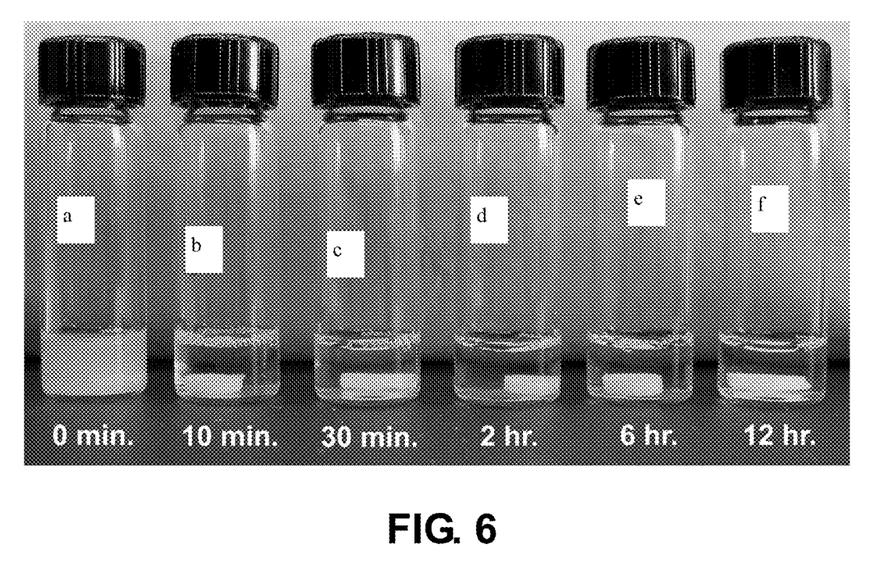
FIG. 6 is a photograph of PLGA50-14K NS-scaffold in a washing test experiment after: a) no vapor treatment, b) the scaffold was treated with THF vapor treatment for 10 minutes; c) the scaffold was treated with THF vapor treatment for 30 minutes; d) the scaffold was treated with THF vapor treatment for 2 hours; e) the scaffold was treated with THF vapor treatment for 6 hours; and f) the scaffold was treated with THF vapor treatment for 12 hours.

Both the temperature and time of heat treatment were examined for the immobilization of nanospheres onto the scaffold. As shown in FIG. 1, with an increase in heat treatment temperature, nanosphere detachment decreased. Increasing treatment time at sufficiently high temperatures led to reduced detachment of nanospheres during the washing test (see FIGS. 3 and 4). At 37° C., the immobilization was relatively poor, even with the increase of treatment time up to 6 hours (see FIG. 3, vials a-c and FIG. 4, vials and b). Heat treatment at 47° C. for 30 minutes was sufficient for the immobilization of both PLGA50-14K and PLGA75-113K nanospheres onto the scaffold (see FIG. 3, vials d-e, and FIG. 4, vials c-d).

FIGS. 5A through 5F depict the PLGA50-14K NS-scaffolds that are untreated and are treated with a heat treatment as disclosed herein. Without heat treatment, the nanospheres were loosely distributed in the nano-fibrous networks of the scaffold (see FIGS. 5A and 5B). After a washing test was performed, large amounts of nanospheres were lost (see FIGS. 5C and 5D). With heat treatment at a sufficiently high temperature and for a sufficiently long time (e.g., at 47° C. for 30 minutes), no significant loss of nanospheres or morphological changes were observed for NS-scaffold after the washing test (see FIGS. 5E and 5F). The heat treated NS-scaffold retained the well-connected macroporous structures with nanospheres attached to the nano fibers.

Solvent Vapor Treatment

Without being bound to any theory, the solvent vapor treatment as disclosed herein immobilizes particles (e.g., nanospheres) onto a variety of surfaces, including complex surfaces (e.g., those of a porous scaffold). The solvent may partially dissolve the surface of the particles (PLGA nanospheres) and/or the surfaces of the porous materials (e.g., PLLA nano-fibrous scaffold).

There are many ways to treat a system with a solvent vapor. In this example, the particle-containing porous material (e.g., NS-scaffold) was placed in a container that was saturated with, or contained, a significant amount of a solvent vapor under room temperature for a certain time. More complicated treatment processes (such as, for example, using multiple vapors, with programmed vapor exposures, or blowing the vapor over the particle-surface (particles and porous materials) and so forth) may be used in place of the example disclosed herein. After the treatment, the NS-scaffold was vacuum dried for 2 days to remove the solvent. Scaffolds without nanospheres were used as controls to examine the effect of solvent vapor treatment on the structure of the scaffold (such as the nano-fibrous structure of the scaffold).

Figure 7A:
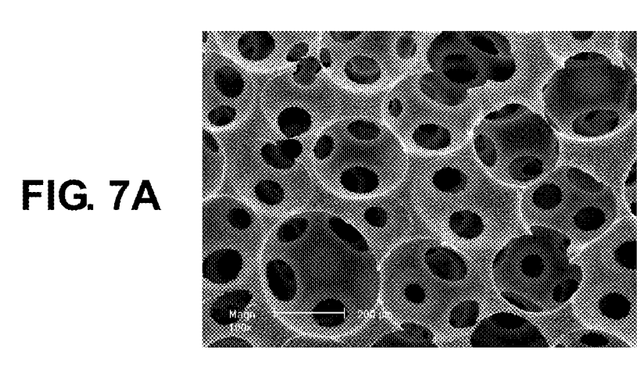
FIGS. 7A and 7B depict SEM micrographs of PLGA50-14K NS-scaffold after the scaffold was treated with THF vapor treatment for 10 minutes, at 100× and 10000×, respectively.
Figure 7B:
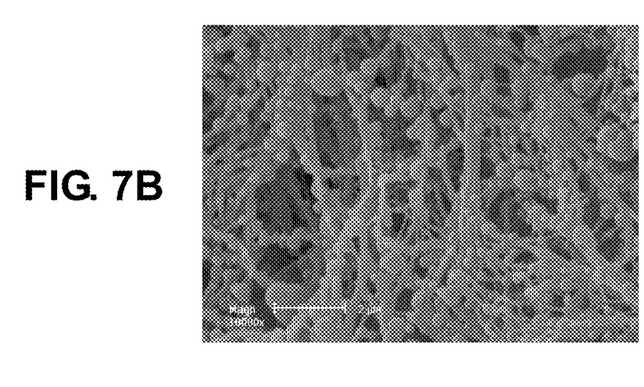

In this immobilization technique, any solvent for the polymer(s) of the particles (e.g., nanospheres for growth factor delivery) and/or the complex surfaces (e.g., porous materials such as scaffolds) may be used as long as it forms vapor under the treatment conditions. For the PLGA nanospheres and PLLA scaffolds, THF vapor treatment was used to immobilize the nanospheres onto the (nano-fibrous) PLLA scaffolds. Ten minutes in saturated THF vapor at room temperature was sufficient to attach nanospheres onto the nano-fibrous scaffolds. SEM micrographs show that the morphology of the nanospheres was maintained after treatment (see FIG. 7). Detachment of nanospheres was not detectable for NS-scaffold after washing test.

Quantification

Figure 8:
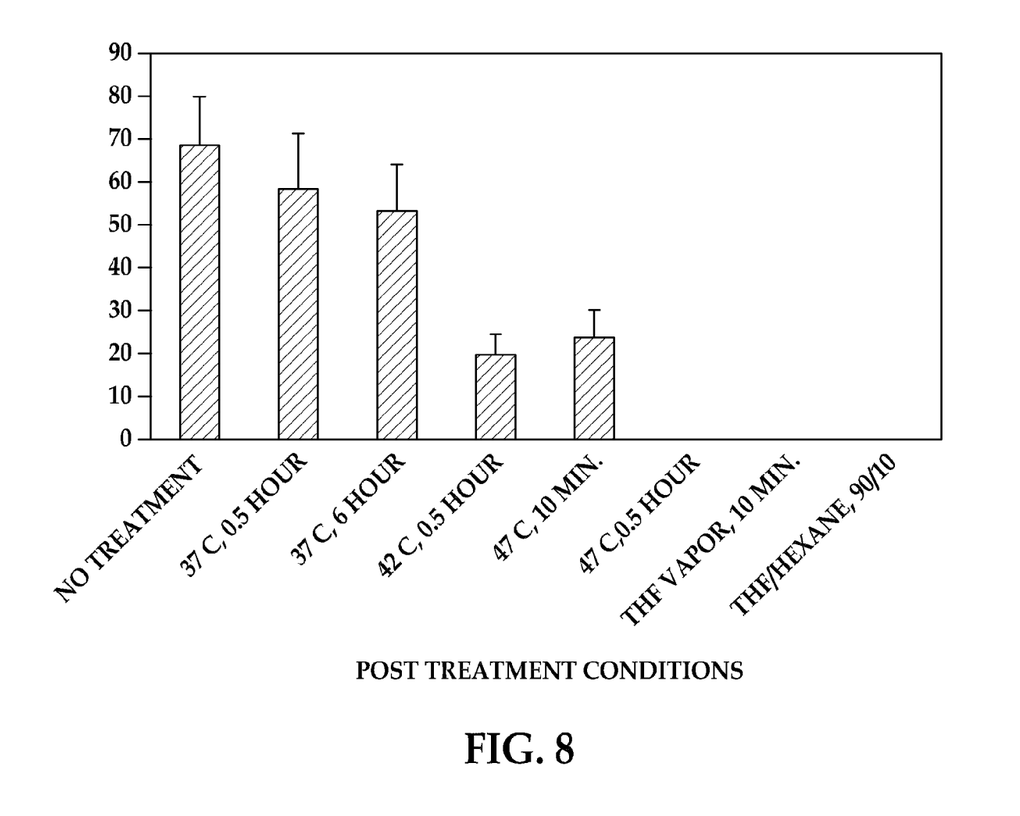
FIG. 8 is a graph depicting nanosphere weight loss during a washing test experiment after various immobilization treatments.

The detachment of nanospheres from NS-scaffolds, which were treated as described above, was quantified using nanosphere weight loss after washing test experiment. The results are shown in FIG. 8.

About 68% of nanospheres was detached from the NS-scaffold that was not subject to any treatment. As in agreement with macroscopic observation, low-temperature heat treatment (e.g., for the PLGA nanospheres and PLLA scaffolds, 37° C. or lower) did not significantly improve the attachment of the particles (e.g., nanospheres in these examples). More than 50% of nanospheres detached away from scaffold after the washing test.

When the treatment temperature was high enough (e.g., increased to 42° C. (30 min.) and 47° C. (10 min)), NS immobilization was significantly improved with about 80% nanospheres remaining on the scaffolds after the washing test.

When the temperature is high enough (e.g., 47° C. for the PLGA nanospheres and PLLA scaffolds), and the treatment time is long enough (e.g., 30 minutes at 47° C. for the PLGA nanospheres and PLLA scaffolds), the nanospheres were totally immobilized onto the nano-fibrous scaffolds. This heat treatment was equivalent, in terms of immobilization, to the mixed solvent treatment (THF/hexane=10/90) or solvent vapor treatment (e.g., THF for 10 minutes).

Embodiment(s) of the techniques disclosed herein result in particle-attached surfaces. Non-limiting examples include particle-attached flat surfaces, films, slabs, bulk materials of any geometry (regular or irregular), and porous materials or devices. As previously described, the surfaces may be part of a relatively simple object, or a relatively complex porous material.

In an embodiment in which the surface is a porous material, it is to be understood that the porous material may be fabricated as part of the method disclosed herein, or it may be a pre-fabricated porous material. In an embodiment, the porous material(s) is/are formed via the combination of phase separation and leaching techniques (e.g., sugar-leaching, paraffin leaching, etc.).

An object may be used to form the porous material. The object may be formed by any suitable manual or automated processing methods. As a non-limitative example, the object (e.g., a sugar sphere porogen or a paraffin sphere porogen) is formed via non-surfactant emulsification, solvent extraction, and freeze-drying. As an alternate, air-drying may be used to dry the object. Without being bound to any theory, it is believed that the surface morphology of the object may change when different drying techniques are implemented. For example, freeze-drying may result in a nano- or micro-featured surface morphology while air-drying may not achieve the same pore surface morphology. As such, the drying technique may be selected, depending, at least in part, on the desired surface morphology of the porous material to be formed.

A material (that will form the porous material) is introduced/cast into and/or onto the object. It is to be understood that the material(s) may include any suitable material(s) for flowing and casting into/onto a mold/object under predetermined conditions. Generally, non-limitative examples of such materials include polymeric materials selected from natural or synthetic hydrophilic polymers, natural or synthetic hydrophobic polymers, natural or synthetic amphophilic polymers, degradable polymers, non-degradable polymers, partially degradable polymers, proteins, polysaccharides, hydrocarbon polymers, lipids, artificial proteins, and/or combinations thereof. More specific non-limiting examples of such materials include poly(L-lactic acid) (PLLA), poly(lactide-co-glycolide) (PLGA), polyglycolic acid (PGA), polyanhydrides, poly(ortho ethers), polycaprolactone, poly(hydroxy butyrate), poly(phosphoesters), poly(propylene fumarate), polyphosphazenes, polycarbonates, polyethylene, polyurethane, glycol (PEG), polyethylene glycol (PEG), polyvinyl alcohol (PVA), gelatin, collagen, alginate, chitin, chitosan, pectin, copolymers thereof, and combinations thereof.

In an embodiment, the material, upon being cast onto the object, substantially conforms to the object.

It is to be understood that a plurality of the objects may be arranged to form an assembly, and the material is cast such that it substantially penetrates areas (e.g., pores) of the assembly between the plurality of objects. The method(s) for forming the assembly may be any suitable methods and/or combinations of methods (e.g., arranging and heating a plurality of objects in a mold). It is to be further understood that the areas of the assembly may be random, uniform, predesigned, and/or combinations thereof. Furthermore, the areas may be assembled using manual processes and/or automated processes.

One non-limiting example of such an assembly is a porogen (a pore-generating material). In this embodiment, predetermined pores/porous structures of suitable size(s) are formed in the material that is cast upon the porogen, resulting in a porous 3-D object. One non-limiting example of predesigned areas in the porogen includes predesigned, interconnected, open pores. In an embodiment in which a porogen is used, the method may further include pre-treating the porogen in water vapor, solvent vapor, water and/or solvent, and/or via heat and/or mechanical loading, and/or combinations of any of these materials/processes to bond at least some of the plurality of objects, thereby forming the interconnects and pores.

After the material is cast onto the object (or plurality of objects, assembly, porogen, etc.), the material may be further manipulated (e.g., via phase separation, solvent evaporation, solvent extraction, freeze-drying, and/or the like, and/or combinations thereof). In an embodiment, phase separation is induced by exposing the material and object to temperatures below freezing. The structures and properties of the porous materials generally depend, at least in part, on the object(s) used, the methods used to form the object(s), type of polymer(s), type of solvent(s), the polymer/solvent systems (e.g., mixture ratio of two or more types of polymer(s) and/or solvent(s)), polymer concentration, the phase-separation conditions (e.g., temperature), etc.

The object(s) is/are then removed from the porous material. Non-limitative examples of such removal processes include dissolving or melting the object, thereby leaving the molded porous material.

The surfaces may advantageously be used in tissue engineering scaffolds, wound-healing dressings, filtration membranes, dialysis devices, chromatographic fillers, and/or the like, and/or combinations thereof. The particles may also advantageously be controlled release vehicles for therapeutic or biological agents, moieties to regulate cell behavior or physiological responses, surface property mediators, topographical modifiers, mechanical property enhancers, and/or the like, and/or combinations thereof.

While several embodiments have been described in detail, it will be apparent to those skilled in the art that the disclosed embodiments may be modified. Therefore, the foregoing description is to be considered exemplary rather than limiting.

What is claimed is:

1. A method for immobilizing controlled release agent-embedded polymer micro-particles, nano-particles or combinations thereof onto a polymer surface, the method comprising:
    suspending the agent-embedded polymer micro-particles, nano-particles or combinations thereof in a liquid non-solvent of at least one of: i) the polymer surface; ii) the agent-incorporated polymer micro-particles, nano-particles or combinations thereof; or iii) both the polymer surface and the agent-embedded polymer micro-particles, nano-particles or combinations thereof, thereby forming a non-solvent-particle suspension;
    adding the suspension to the polymer surface; and
    after the adding step, exposing the polymer surface and the agent-embedded polymer micro-particles, nano-particles or combinations thereof to vapor treatment, wherein the vapor treatment is applied for about 10 minutes at room temperature, and wherein the vapor treatment involves a solvent vapor of at least one of i) the polymer surface; ii) the agent-embedded polymer micro-particles, nano-particles or combinations thereof; or iii) both the polymer surface and the agent-embedded polymer micro-particles, nano-particles or combinations thereof, the vapor treatment being accomplished in a manner sufficient to partially dissolve at least one of: surfaces of the polymer surface; or surfaces of the agent-embedded polymer micro-particles, nano-particles or combinations thereof, thereby adhering at least some of the agent-embedded polymer micro-particles, nano-particles or combinations thereof to the polymer surface.

2. The method as defined in claim 1 wherein the polymer surface is selected from internal surfaces of pores in porous materials, external surfaces of pores in porous materials, substantially flat surfaces, surfaces having regular geometries, surfaces of porous materials, and combinations thereof.

3. The method as defined in claim 1 wherein the agent is selected from proteins, hormones, DNA, RNA, nutrients, drugs, biologically regulating agents, and combinations thereof.

4. The method as defined in claim 1 wherein adding the suspension to the polymer surface is accomplished by pouring the suspension substantially directly on the polymer surface.

5. A method for immobilizing controlled release agent-embedded polymer micro-particles, nano-particles or combinations thereof onto a surface of a three-dimensional polymer scaffold having a nano-fibrous network, the method comprising:
    suspending the agent-embedded polymer micro-particles, nano-particles or combinations thereof in a solvent material that is a non-solvent of both the surface and the agent-embedded polymer micro-particles, nano- particles or combinations thereof, thereby forming a non-solvent-particle suspension consisting of the agent-embedded polymer micro-particles, nano-particles or combinations thereof and the non-solvent, wherein the non-solvent is selected from the group consisting of hexane and cyclohexane;
    adding the suspension directly to the surface; and
    then exposing the surface and the agent-embedded polymer micro-particles, nano-particles or combinations thereof added to the surface to thermal treatment, wherein the thermal treatment occurs only after adding the suspension directly to the surface, the thermal treatment being accomplished in a manner sufficient to soften at least one of: surfaces of the polymer scaffold surface; or surfaces of the agent-embedded polymer micro-particles, nano-particles or combinations thereof, thereby adhering at least some of the agent-embedded polymer micro-particles, nano-particles or combinations thereof to the surface.

6. The method as defined in claim 5 wherein the surface is selected from internal surfaces of pores of the three-dimensional polymer scaffold, external surfaces of pores of the three-dimensional polymer scaffold, and combinations thereof.

7. The method as defined in claim 5 wherein the agent is selected from proteins, hormones, DNA, RNA, nutrients, drugs, biologically regulating agents, and combinations thereof.

8. The method as defined in claim 1 wherein the polymer surface is a poly(L-lactic acid) scaffold, wherein the agent-embedded polymer micro-particles, nano-articles or combinations thereof include poly(lactide-co-glycolide) as the polymer, and wherein the solvent vapor is tetrahydrofuran vapor.

9. The method as defined in claim 5 wherein prior to suspending, the method further comprising making the three-dimensional polymer scaffold having the nano-fibrous network via a combination of phase separation and leaching techniques.

10. The method as defined in claim 1 wherein the polymer surface is selected from surfaces having irregular geometries.

11. The method as defined in claim 5 wherein the polymer scaffold is a poly(L-lactic acid) scaffold, wherein the agent-embedded polymer micro-particles, nano-particles or combinations thereof include poly(lactide-co-glycolide) as the polymer, and wherein the thermal treatment includes heat treating the surface and the agent-embedded polymer micro-particles, nano-particles or combinations thereof at a temperature ranging from about 42° C. to about 47° C.

12. The method as defined in claim 11 wherein the heat treating is accomplished at 47° C. for about 30 minutes.

13. The method as defined in claim 5 wherein the thermal treatment includes heat treating the polymer scaffold surface and the agent-embedded polymer micro-particles, nano-particles or combinations thereof to one of a glass transition temperature or a melting temperature of the polymer scaffold surface.

14. The method as defined in claim 5 wherein upon suspending the agent-embedded polymer micro-particles, nano-particles or combinations thereof in the non-solvent, the agent-embedded polymer micro-particles, nano-particles or combinations thereof are distributed on the surface of the three-dimensional polymer scaffold such that the particles attach to the surface via physical processes.

15. The method as defined in claim 14 wherein, before the exposing to the thermal treatment, the agent-embedded polymer micro-particles, nano-particles or combinations thereof are capable of being washed off the surface by the non-solvent.

* * * * *